(12) United States Patent
Spijker

(10) Patent No.: US 9,910,237 B2
(45) Date of Patent: Mar. 6, 2018

(54) OPTICAL FIBER CABLE INSTALLATION IN A PRESSURE SEWERAGE

(71) Applicant: JELCER-IP B.V., Dedemsvaart (NL)

(72) Inventor: Johannes Gerhardus Spijker, Dedemsvaart (NL)

(73) Assignee: JELCER—IP B.V., Dedemsvaart (NL)

( * ) Notice: Subject to any disclaimer, the term of this patent is extended or adjusted under 35 U.S.C. 154(b) by 558 days.

(21) Appl. No.: 14/387,633

(22) PCT Filed: Apr. 19, 2013

(86) PCT No.: PCT/NL2013/050287
§ 371 (c)(1),
(2) Date: Sep. 24, 2014

(87) PCT Pub. No.: WO2013/157947
PCT Pub. Date: Oct. 24, 2013

(65) Prior Publication Data
US 2015/0153533 A1    Jun. 4, 2015

(30) Foreign Application Priority Data

Apr. 19, 2012   (WO) ................ PCT/NL2012/050266
Oct. 17, 2012   (NL) ..................................... 2009654

(51) Int. Cl.
| F16L 55/10 | (2006.01) |
| G02B 6/44 | (2006.01) |
| G02B 6/50 | (2006.01) |
| F16L 41/02 | (2006.01) |
| G02B 6/46 | (2006.01) |
| H02G 1/08 | (2006.01) |

(52) U.S. Cl.
CPC ............ *G02B 6/4459* (2013.01); *F16L 41/02* (2013.01); *G02B 6/4464* (2013.01); *G02B 6/46* (2013.01); *G02B 6/502* (2013.01); *H02G 1/086* (2013.01); *Y10T 137/8376* (2015.04)

(58) Field of Classification Search
CPC ........ G02B 6/4459; H02G 1/086; F16L 41/02
USPC .......................................................... 138/108
See application file for complete search history.

(56) References Cited

U.S. PATENT DOCUMENTS

| 4,756,510 A | 7/1988 | Klamm |
| 6,354,331 B1 | 3/2002 | Fisher |
| 2004/0247264 A1 | 12/2004 | Beals |

FOREIGN PATENT DOCUMENTS

| DE | 3140928 | 5/1983 |
| DE | 19734274 | 2/1999 |

(Continued)

OTHER PUBLICATIONS

DE 10201720 with Machine Translation.*

*Primary Examiner* — Vishal Pancholi
(74) *Attorney, Agent, or Firm* — Marcus C. Dawes; Daniel L. Dawes

(57) ABSTRACT

The manifold is provided with a first cable passage at a first longitudinal position and a second cable passage at a second longitudinal position, wherein a releasable pipe segment is present between the first and the second longitudinal positions. It is suitable for use in a pipe, such as a pressure sewer. In use, a cable would be laid through the pipe with the manifold. Thereafter, the releasable pipe segment would be removed from neighboring pipe shells. The cable would be inserted into the cable passages, and a second pipe segment would replace the initial pipe segment.

14 Claims, 3 Drawing Sheets

(56) References Cited

FOREIGN PATENT DOCUMENTS

| | | |
|---|---|---|
| DE | 10201720 | 7/2003 |
| EP | 0450814 | 10/1991 |
| EP | 0780942 | 6/1997 |
| EP | 1011001 | 6/2000 |
| GB | 2228777 | 9/1990 |
| GB | 2312995 | 11/1997 |

\* cited by examiner

OPTICAL FIBER CABLE INSTALLATION IN A PRESSURE SEWERAGE

FIELD OF THE INVENTION

The invention relates to the laying of a cable in a medium conduit. The invention also relates to a thus obtained medium conduit provided with a cable. The invention further relates to auxiliary means for use herein.

BACKGROUND OF THE INVENTION

Cables for telecommunication, such as glass fibre cables in particular, are seen as the basis of a communication network. Efficiency requires that use be made of already existing pipe systems in the ground for the purpose of laying such a new cable network. A sewer forms a very suitable pipe network here. The sewer system in cities comprises a network of main sewers running below streets to which individual house sewers or house sewer connections are connected. The main sewer has a cross-section sufficiently large for a robot, and there are sewer drains through which a glass fibre cable can be introduced into the sewer. A method for laying a glass fibre cable in such a main sewer is per se known from EP 1868020.

In for instance an outlying area outside a city the number of connections to the sewer per kilometer is low. This causes too little flow in a normal sewer for the purpose of draining the sewer content. Use is thus often made of a pressure sewer. This is a pipe with a small diameter which is operated with a pressure pump such that the sewer content is actively pumped away. The house connection of a dwelling to a pressure sewer effectively consists of a catch pit which is emptied on a regular basis by pumping to the pressure sewer. As a result it is not possible to introduce a robot into an existing pressure sewer for the purpose of laying a glass fibre cable. Nor is it possible to simply open the pressure sewer in order to make a connection. It is further not possible to draw the glass fibre cable to a dwelling via a house connection of the sewer, but a bridging is necessary between a connection point in the pressure sewer and a further connection to the dwelling, such as for instance an inspection well.

The British patent application GB 2312995 discloses a solution for introducing a glass fibre cable into a medium conduit for a medium under pressure. This relates particularly to a water conduit or a gas conduit, with a pipe as primary component of the system. A cable is introduced into the pipe here together with a pulling member. The pulling member will pull the cable through the pipe. A spreadable and collapsible pulling member is used for a medium under pressure. The pulling member is provided for this purpose with suitable means, such as a collapsible screen. The screen absorbs the pressure and is in this way carried along with the flow in the pipe. Situated at a first longitudinal position where the cable has to be taken out of the medium conduit is a cable outlet. Situated at a second longitudinal position located a little further along (i.e. downstream) is a cable inlet with which the cable can once again be introduced into the pipe of the medium conduit. According to this British patent application, taking out the cable serves the particular purpose of circumventing obstacles in the medium conduit. In the case of a gas conduit this is for instance a closing valve.

It is however a drawback of the known medium conduit that the cable is situated inside the medium conduit at a position which cannot be determined. When the medium conduit transports something other than gas or liquid, such as in particular a pressure sewer, this can easily result in highly undesirable blockages. Not only must a blockage be cleared as quickly as possible, a blockage is also difficult to trace since the conduit is located under the ground and is optically non-transparent.

SUMMARY OF THE INVENTION

It is therefore an object of the present invention to provide tools and a method with which a glass fibre cable network can also be arranged and connected via a pressure sewer.

It is more particularly an object of the present invention to provide a manifold suitable for use in a medium conduit suitable for transport of a medium using pressure and suitable for receiving a cable.

Further objects relate to the provision of a system of such medium conduit and a cable and the use thereof for provision and operation of a glass fibre cable network. These objects are achieved in accordance with the invention with a medium conduit comprising a manifold provided with a first cable passage at a first longitudinal position and a second cable passage at a second longitudinal position, wherein a releasable pipe segment is present between the first and the second longitudinal positions. The object is also achieved with the manifold as such.

The object is further achieved with a method comprising the steps of drawing the cable through the pipe of the medium conduit in accordance with the invention; releasing the first releasable pipe segment from the manifold; taking a piece of the cable out through the first and the second cable passages and forming a loop, and assembling a second pipe segment in the manifold, wherein the cable does not pass said second pipe segment.

The object is further achieved with a system of medium conduit and cable obtainable with the method of the invention, and the use of the system, further comprising a house connection, for data communication.

The invention is based on the use of a manifold inserted in the medium conduit, which itself includes again a releasable segment. Such a manifold differs essentially from the saddle piece disclosed in the stated British patent application. This is because the saddle piece is on the upper side of the pipe and covers an underlying, limited hole. A hinge is provided for placing and securing the saddle piece around the pipe.

The invention is also based on the fact that a cable passage not only functions as passage for the cable from inside to outside and vice versa, but also that, owing to the cable passages, the location of the cable inside the pipe can be better controlled. The embodiments of the medium conduit according to the invention are highly suitable for controlling and modifying the location of the cable in the pipe.

The manifold comprises a second cable passage in addition to a first cable passage, wherein a single piece of cable lies in each cable passage. This ensures that the cable is better guided, whereby there is less risk of breakage.

The manifold is provided with a slot with a length in the axial direction of the pipe, this length of the opening being sufficient to form a loop in the cable, which slot is closable with the pipe segment.

In order to avoid lack of clarity it is noted that the term 'manifold' in the context of the present application is intended functionally as the system which extends in the pipe or as replacement of a portion of the pipe and in which the cable passage is integrated. The manifold need not therefore be a single component but can comprise a plurality of components of the same or different material. The term 'shell' is used for an essentially tubular means extending between pipe parts for the purpose of sealing a longitudinal opening. It cannot be precluded here that the shell might also extend partially along one or more of the pipe parts. This is not recommended however if the shell is intended to rotate in its entirety with the cable passage.

The releasable pipe segment may well be optically transparent, so as to allow visual inspection during release i.e. removal of the releasable pipe segment from the manifold. This visual inspection may minimize the risk of damaging the cable unintentionally. Most practically would be a segment that is fully optically transparent, but a segment with a window constitutes an alternative.

The releasable pipe segment may be further provided with means for facilitating at least partial destruction thereof. Such facilitating means may be embodied as a groove or similar structure locally weakening the pipe segment. Such structure may effect crack initiation and/or crack propagation, so that the pipe segment can be broken.

Suitably, thereto, the pipe segment comprises a material that is relatively brittle, so that the pipe segment may be destroyed by breakage rather than explicit cutting. One more suitable embodiment is that specified knocking on the pipe segment, for instance with a hammer, may already provide breakage or cracking over at least a portion of the pipe segment.

Rather than immediate destruction, the releasable pipe segment is suitably first removed from the first and second pipe shells at opposite sides thereof. This removal is suitably arranged by means of moving the pipe shell and the pipe segment relative to each other. More preferably, one would first move backwards one pipe shell, relative to the pipe in which the manifold is inserted.

Preferably, the pipe segment has a diameter that is smaller than the diameter of the pipe shells. More preferably, the cable passage is located adjacent to the pipe segment, i.e. at the same axial position. The second pipe segment taking the place of the released pipe segment suitably has the same diameter of the initial pipe segment. The material is suitably chosen in order to obtain a minimum risk of leakage between the pipe shells and the second pipe segment. Also shape and ends may be optimized for this purpose.

Suitably, the manifold can be rotated between a protected position and a service position. The protected position is particularly a position wherein the exposed cable is protected against damage during excavation work. The risk for damage is considerable, since excavation work is usually carried out by people not aware of the presence of the cable passage and/or cable. Mistakes are mede here in positioning during excavation work and use is made of auxiliary means which do not make allowance for the vulnerability of a cable, in particular a glass fibre cable.

In a suitable embodiment of the medium conduit the first cable passage is provided with a cable tensioner for tensioning a portion of the cable extending in the medium conduit from the first longitudinal position. A portion of the cable can hereby be tensioned. Such a portion extends for instance over a distance of 50 meters to 1 kilometer. It is not inconceivable for loops to occur or for play to occur during drawing of the cable in the pipe through said portion, for instance in bends. These loops are removed by tensioning the cable, so greatly reducing the risk of blockages. The portion of the cable for tensioning extends particularly from a first house connection to a previous or subsequent house connection, or the first or second point. The portion of the cable for tensioning can lie upstream as well as downstream of the first longitudinal position. During tensioning of a portion of the cable between a first and a second house connection the cable is typically first secured to the first house connection, then pulled taut and subsequently secured to the second house connection.

The cable tensioner particularly comprises a means with which the location of the cable is determined and is preferably used in combination with a means with which the cable is tightened. The means for fixing the cable is for instance a screw turnbuckle. For tightening of the cable use can be made of a motor, but also of a pulley or such auxiliary means. This means for tightening the cable need not be connected to the first cable passage.

Alternatively, pipes of medium conduits can be equipped with a groove intended for the cable. An auxiliary means such as a cable tensioner is then not necessary. Such a medium conduit pipe with groove otherwise appears to be particularly applicable in sewers when a cable has already been arranged before the sewer is taken into use.

In a further embodiment, the cable passage comprises an inner surface of a rubber-elastic material. This material is sufficiently elastic, so that under water pressure a cable may flow through the cable passage. However, without such water flow, the inner surface effectively constitutes a seal. The cable therewith cannot move any longer.

Therefore, the cable passage of this embodiment effectively functions as a cable tensioner as well.

Suitable, the cable passage is a channel within a ring of rubber-elastic material. The cable passage suitably has a sufficient lateral extension, i.e. for instance at least 3 cm, more preferably at least 5 cm or even at least 10 cm. Such a length provides a suitable sealing and tensioning function. The choice of rubber-elastic material will be apparent to the skilled person the field of sewers and construction materials. The rubber-elastic material is suitably a rubber, which may be optimized by means of vulcanisation, molecular weight and monomer composition. Other materials with a similar rubber-elastic behaviour suitable for outdoor use may be used alternatively. The channel is suitably provided with a opening through the rubber-elastic ring, so as to allow the cable to get into the channel after removal of the releasable pipe segment.

It is recommended that the cable passage encloses an angle with the axis of the pipe of a maximum of 60 degrees. Favourable is an angle of 45 degrees or less, particularly favourable is an angle of about 30 degrees, for instance between 20 and 35 degrees. If the angle becomes too large, there is an increasing risk of a kink occurring in the cable. This is particularly the case when the cable is tensioned from the cable passage.

In a further embodiment an inspection well is arranged in the medium conduit at a further longitudinal position. It has been usual practice heretofore to saw through a pressure sewer when a blockage occurs. Sawing through a pressure sewer in which a cable is arranged does however result in the cable also being sawn through. This must not happen. The necessity of sawing through the medium conduit is obviated by the presence of one or more inspection wells. It is very much easier to install such an inspection well prior to drawing of the cable through the medium conduit; such an inspection well is preferably placed by making a longitudinal opening in the pipe and then placing the inspection well.

In yet another embodiment a flushing tap is present at a further longitudinal position on the medium conduit. A flushing tap is intended for the purpose of flushing clean a part of the pressure sewer. The flushing tap can also be used as inspection well, and is or can be provided with auxiliary means with which a cable is introduced into the medium conduit, particularly provided with a pulling member which is displaced by the pressure in the medium conduit, such as the liquid pressure generator. It is particularly favourable when the flushing tap is present at the first point and is used to feed liquid, in particular water, into the medium conduit with which said pulling member and the cable are displaced. Instead of having an explicit coupling of the flushing tap to a water main, the flushing tap can be coupled to a releasable conduit as for instance applied by the fire services.

It will be apparent that the house connections, i.e. the first passages, are arranged at a desired number of positions on the medium conduit, for instance in a density of 2 to 40 per kilometer. It is favourable for the inspection well to be also arranged at regular distances in the medium conduit, for instance in a density of 0.3 to 3 per kilometer. This is not only favourable with a view to inspection, but is also suitable for an adequate throughfeed of the cable during drawing through the medium conduit.

When the medium conduit has a longer length than the intended distance (for instance 400 meters to 2.5 kilometers) spanned between the first and the second point, it has been found favourable to nevertheless take the cable out of the medium conduit at the second point. The amount of cable necessary for the distance to a third or fourth point is then temporarily stored on a giant reel. The cable is then fed back into the medium conduit at the second point and guided with the pulling member to the third point. Liquid is preferably added here to the medium conduit from or in the vicinity of the second point. Using this method there is sufficient pressure buildup to displace the cable.

It is noted that it is not precluded that from said second point the cable is guided further outside the medium conduit, and only reintroduced into the medium conduit at a further point.

The invention preferably makes use of a pulling member at the outer end of the cable which provides for buildup of liquid pressure if necessary. This pulling member is also referred to as a liquid pressure generator. This liquid pressure generator has the particular purpose of building up liquid pressure in order to push aside or circumvent possible obstacles. This does however also make it possible for the cable to be carried along substantially by liquid without the necessity of applying additional pressure from the very start.

BRIEF DESCRIPTION OF THE FIGURES

These and other aspects of the invention will be further elucidated with reference to the following figures, in which.

DETAILED DISCUSSION OF ILLUSTRATIVE EMBODIMENTS

Figure 1:
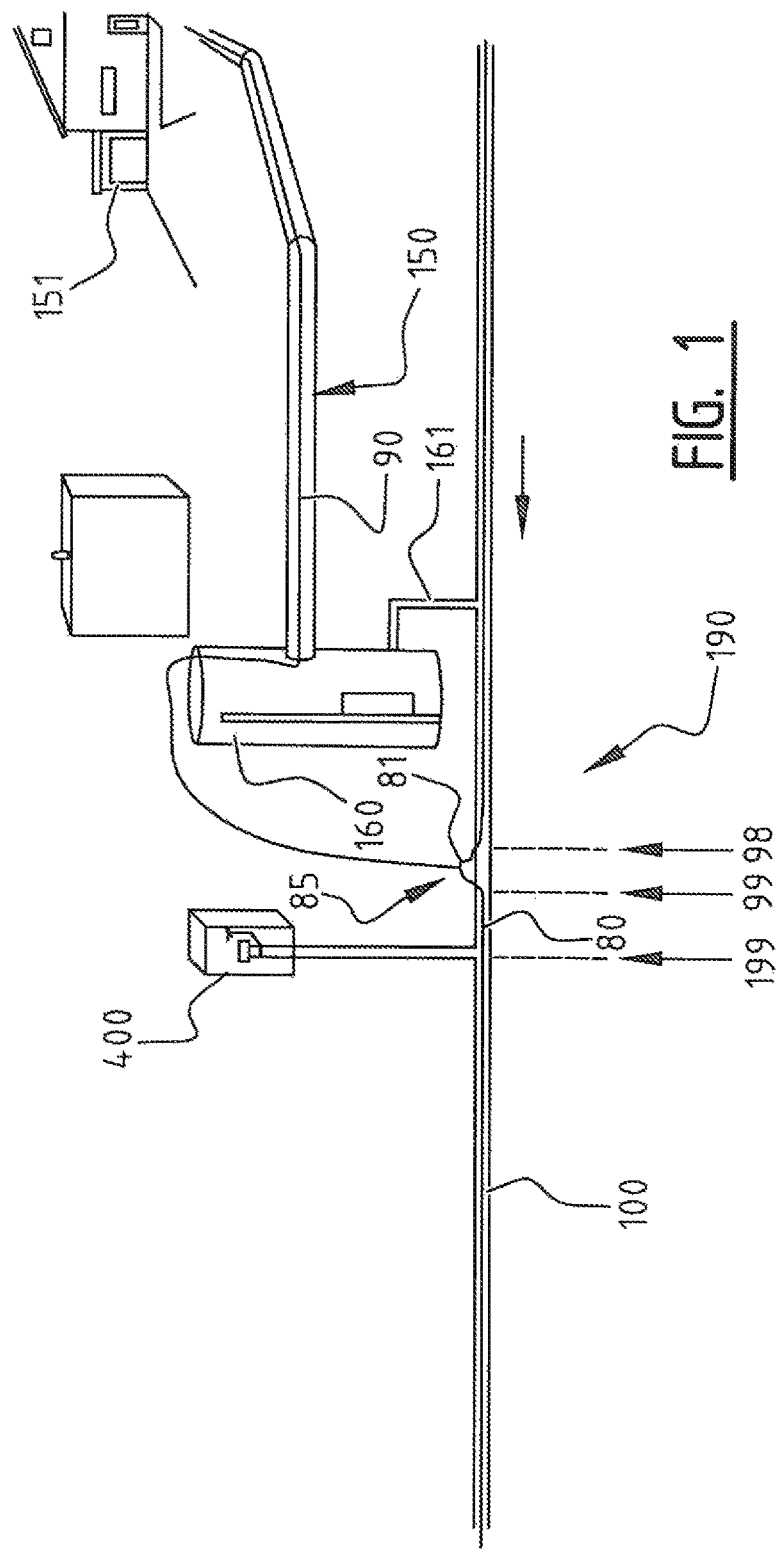
FIG. 1 shows a schematic view of a house connection to the medium conduit according to the invention.

The figures are of schematic nature. Components are not shown to scale. The same or similar elements are designated in different figures with corresponding reference numerals.

FIG. 1 is a schematic view of a house connection 190 to medium conduit 100 according to the invention. In this embodiment medium conduit 100 is a pressure sewer. Not otherwise precluded is that the invention is applied to another type of medium conduit, such as a water conduit, a district heating system based on conduits with hot water or hot air, a gas conduit. Particularly suitable is a sewer, and more precisely a pressure sewer, which as a relatively small diameter. Rather than a pressure sewer, a separate corresponding medium conduit could be used, which is however not intended for use as a sewer, gas or water conduit. This may be more effective in some areas, dependent on the state of any existing sewer. The medium conduit is suitable for transporting a medium using pressure, wherein it is not necessary for the pressure to be continuously present; pressure sewers are for instance usually operated by a number of pumps which are only activated at regular or irregular times. The terms 'pressure sewer' and 'medium conduit' will be used interchangeably. The medium flows in the medium conduit in the direction indicated by the arrow. The initial purpose of a pressure sewer is to flush away excreta, surplus water and the like using pressure. The mass for flushing away is transferred for this purpose from a dwelling 151 via a house connection pipe 150 to a catch pit 160. When catch pit 160 has been filled to a certain level, it is emptied via channel 161 into medium conduit 100 in which the mass is displaced by means of pressure.

A communication cable 80, in particular a glass fibre cable, such as a cable including a plurality of glass fibers and known per se, for instance from Draka, is arranged in medium conduit 100 so that no separate trenches need be dug for this glass fibre cable. Communication cable 80 will be referred to simply as cable hereinbelow. The use of the same system for other cables such as electricity cables is not precluded. Although reference is made in general sense here to cable 80, it is recommended that cable 80 comprises a set of individual cables, each intended for an individual connection. The signals from the individual cables are then transmitted in known manner at a collection point, i.e. by means of modulation, to a or a limited number of optical lines and thus transmitted further. Not precluded is that such a modulation step already takes place closer to dwelling 151, for instance at house connection 190. This is specifically effective when the number of connections becomes very high, so that a single cable 80 in the medium conduit can no longer comprise the individual cables.

A house connection 190 is required to connect dwelling 151 to cable 80 in medium conduit 100. A portion 81 of cable 80 is taken out of the medium conduit at a first longitudinal position 98 via a first cable passage, as will be further discussed with reference to FIG. 3 and following. The cable is reintroduced into medium conduit 100 via a second cable passage at a second longitudinal position 99. The mutual distance between the first and the second longitudinal positions 98, 99 is very short. The distance is typically less than one meter, while medium conduit 100 as a whole is kilometers long. A connecting cable 90 is connected via a weld 85 to the exposed portion 81 of cable 80. In this example the house connecting cable 90 is guided further to dwelling 151 via house connecting pipe 150. This is of course not essential, though is deemed favourable. An inspection well 400 is situated at a further longitudinal position 199 located downstream of the first and the second longitudinal positions 98, 99. This inspection well can be used for different functions, i.e. as cable inlet, as flushing tap and as inspection well for the state of the sewer itself.

Figure 2:
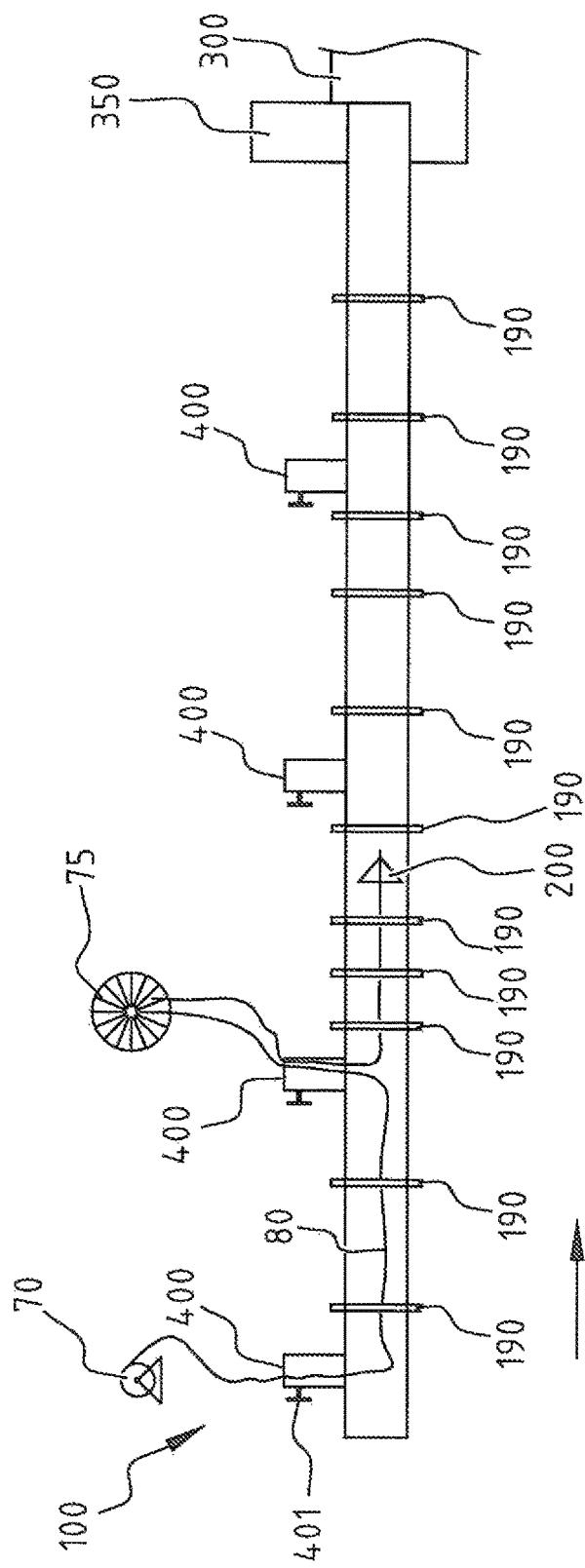
FIG. 2 shows a schematic view of the medium conduit.

FIG. 2 is a schematic view of medium conduit 100 in a more abstract form. The flow direction is once again indicated here with the arrow. This FIG. 2 shows a plurality of house connections 190 and a number of inspection wells 400. Also shown is the end point of pressure sewer 100, in this example the transition to a conventional sewer 300 which operates without pressure. An inspection well 350 is coupled to this transition. Normally the location of house connections 190 is substantially determined by the location of the dwellings for connection, so that the distance between house connections 190 is not or need not be constant. It is noted that, during installation or modification of this medium conduit 100 suitable for cables, additional house connections 190 can be drawn which do not correspond to existing dwellings. It has been found favourable for the inspection wells 200 to be arranged at a regular distance from each other. This is because cable 80 is guided through medium conduit 100 by means of a parachute 200 on the basis of the pressure present therein. When the distance between inspection wells 400 becomes too great, it is found more difficult to guide cable 80 with sufficient speed through the medium conduit. Inspection moreover has to be carried out by placing a camera in medium conduit 100 via this inspection well 400. It is here also the case that too great a mutual distance limits reliability. Coupled to the inspection well is a flushing tap 401 which can be used to flush the medium conduit, but also to provide liquid with which the cable can be pulled through the medium conduit. Not otherwise precluded is that different wells be arranged for various purposes, although this is not a model of efficiency. It is not precluded that the number of flushing taps 401 is smaller than the number of inspection wells 400. The flushing tap 401 can be connected directly to a water main but can also be connected to a local water tank, for instance a mobile water tank, such as a truck provided with a water reservoir. Use can be made of rainwater or other liquid instead of pure water. Determined ingredients can optionally be added to the water so that a cleaning of the medium conduit, in particular sewer, takes place when cable 80 is introduced. Flushing tap 401 can supply liquid under pressure. It is otherwise possible for one or more of the pumps possibly present in or on the medium conduit (particularly pumps of the pressure sewer) to be applied in order to provide the pressure.

When being laid, cable 80 is drawn off a reel 70. Cable 80 is then taken out of medium conduit 100 at the first inspection well 401 and wound onto a reel 75. Use is made here of one or more specific reels suitable for carrying kilometers of cable. Cable 80 is then reintroduced into medium conduit 100 and guided further. It is noted that house connections 190 and inspection wells 400 are already present before introduction of cable 80. After cable 80 has been carried through from a first point to a second point cable 80 is taken out of medium conduit 100 at a house connection 190. Cable 80 has to be laid at an appropriate location inside medium conduit 100, this taking place according to the invention using the cable passages. Use can be made of hooks or other tools to guide cable 80 out of pressure sewer 100 into the cable passages. This can take place despite the fact that the system is under pressure and an open connection will thus result in mass spraying out of medium conduit 100. The presence of flushing tap 401 first of all makes it possible to flush with water during drawing of cable 80. This already limits to some extent the foul nature of any spraying mass. After drawing of the cable from a first to a subsequent inspection well 400 the pressure can then be temporarily relieved. It is then possible to fish cable 80 out of pressure sewer 100. It is noted that variations to this specific laying method are possible within the invention.

For the purpose of drawing the cable 80 use is preferably made of a pulling member 200. Specific examples of pulling members 200 are known from the British patent application GB 2312995A. A first example is spreadable and has the form of an umbrella. The operation is rather more similar to a sail of a sailing vessel: pressure from behind, particularly in the form of a gas or vapour, is blown into the umbrella whereby it moves forward. In the case of a constriction the umbrella will first collide with the element causing the constriction. It is unclear whether the umbrella can then still be collapsed. Whether the pulling member can pass through the constriction cannot be inferred from the example. The stiffness which appears to be desirable for proper operation of the umbrella would seem to be incompatible with such manoeuvrability; it is possible to envisage the umbrella lying at an angle upstream of the constriction but not passing through the constriction. A second example is an inflatable balloon. GB 2312995 shows that the balloon can be inflated and opened from the passage using a cord. This would seem to require an ingenious system which is not however described. A balloon moreover appears to absorb much less pressure than the umbrella. It is not clear whether the cable is sufficiently displaced with a balloon as pulling member.

Figure 4:
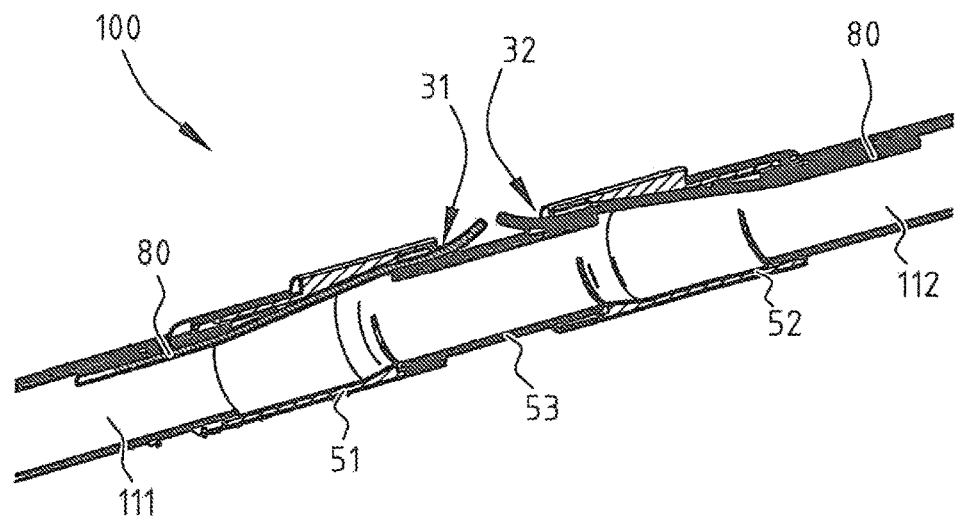
FIG. 4 is a schematic section of the medium conduit shown in FIG. 3.

It is noted that the system shown in FIG. 1-5 of the British patent application GB 2312995 differs considerably in essence from that according to the invention. It shows a conduit with a valve around which a cable is guided. The pulling members of the British patent application are collapsible so that they can pass through a cable passage, i.e. the cable is taken out of the conduit over a certain length so as to go around an obstacle. The cable appears to lie loosely in the pipe and is not positioned in any way at all in the pipe, and is lifted at a cable passage wherein it crosses through the pipe in vertical direction. The opening in the pipe is closed with a saddle piece. That the cable lies loosely need not be a problem in gas conduits, but in medium conduits for liquid and possibly solid constituents this soon results in problems: blockages can occur or, alternatively, pressure on the solid constituents can entrain the loose cable, with breakage as likely result. Breakage is likewise not unlikely when the pulling member is lifted upward through the cable passage as shown in FIG. 4 of the British patent application, wherein the cable effectively forms a very tight loop in the cable passage. In the context of the use of glass fibre cable breakage is not only undesirable because of the complication that individual cables in the cable must be manually connected to each other once the location of the break has been found. Such a breakage is also undesirable because a coupling increases the internal resistance of the glass fibre cable, and thereby reduces the quality of transmission of communication signals (often expressed as the signal-noise ratio). According to the invention, the cable is first guided through the medium conduit from an entrance position to an exit position, and is thereafter taken out of the medium conduit at a position intermediate between the entrance position and the exit position. Thereto, use is made of a manifold that is inserted into the medium conduit, i.e. pressure sewer. The manifold has a releasable pipe segment, which is released after that the cable has been entered into the medium conduit and extends through the medium conduit. The release may for instance be effected, in that pipe shells in the manifold adjacent to said releasable pipe segment can be shifted relatively to a fixed pipe of the medium conduit. Such shift enables exposure of an end of the pipe segment, so that it can be taken out.

Figure 3:
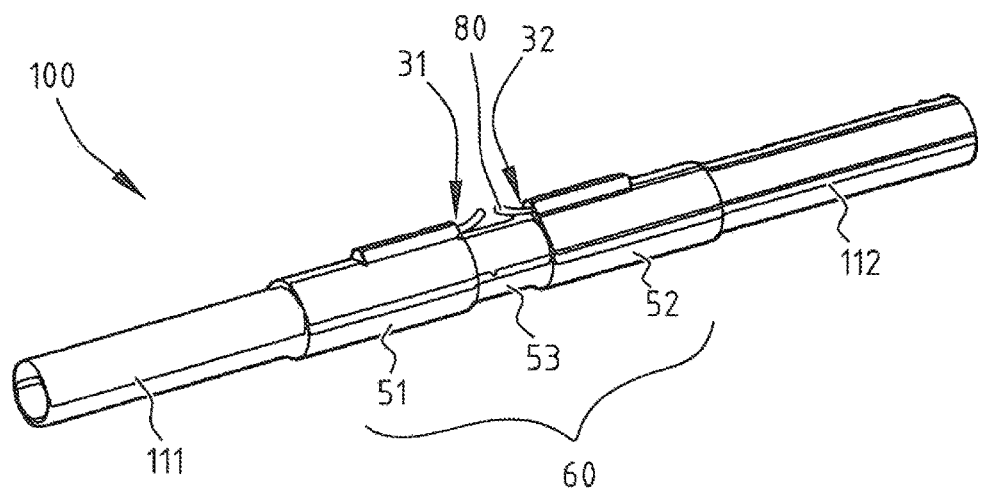
FIG. 3 is a schematic side view of a medium conduit with shell placed therein.

FIGS. 3 and 4 show an embodiment of a medium conduit 100. In this embodiment the manifold 60 effectively comprises a first shell 51, a second shell 52 and a pipe segment 53 therebetween. Fixed to or part of first shell 51 is a first cable passage 31; fixed to or part of second shell 52 is a second cable passage 32. The manifold 60 is located between a first pipe part 111 and a second pipe part 112 of the medium conduit, more particularly a pressure sewer. In this embodiment the connection of first shell 51 to first pipe part 111 and of second shell 52 to second pipe part 112 is such that segment 60 can be rotated from a protected position to a servicing position.

FIGS. 3 and 4 show no further cable guide than that defined by the form of cable passages 31, 32. Specific cable guides and one or more cable tensioners can also be arranged if desired. The first shell 51 and the second shell 52 each have a sealing edge, for instance of rubber-elastic material. The sealing edge extends circumferentially around the pipe segment 53. O-rings and other known means may further be available so as to prevent leakage, but a single sealing edge is deemed a robust solution for the outdoor environment of application. The cable passages 31, 32 are defined as channels in said sealing edge. The cable passages 31, 32 include an angle relative to the main axis of the medium conduit. The angle is suitably small, such as less than 45 degrees and more preferably less than 35 degrees. The use of such an angle prevents damage to or breakage of the cable due to pinching or knicking thereof.

The manifold 60 is initially provided with a releasable pipe segment 53. In order to bring to cable into the cable passages 31, 32, this releasable pipe segment is to be released. It is thereafter replaced by another pipe segment 60. The latter pipe segment may be releasable, but this is not deemed necessary.

The initially provided and releasable pipe segment is suitably designed for reduction of the risk of damage to the cable during the release. It is thereto for instance suitably optically transparent, at least partially, so that an operator can see the cable. Moreover, the pipe segment may be made of or comprise a material that may be broken or cracked, for instance with a hammer. The pipe segment is then removed during or after its release by means of destruction. Such a material is for instance a rigid polymer material, and suitably the pipe segment has a thickness that is suitably for cracking. Alternatively, the pipe segment may be destroyed by cutting, which however has the risk that an unattendant operator would cut the cable as well. Since the cable typically comprises a plurality of individual glass fibers, for instance 60-100 fibers, a significant effort of recoupling all glass fibres is required after such cut. The pipe segment will enter the pipe shells over a certain length that is defined so as to prevent any leakage.

The invention claimed is:

1. Manifold provided with a first pipe shell at a first longitudinal position and a second pipe shell at a second longitudinal position, wherein a releasable first pipe segment is present between the first and the second longitudinal positions, and wherein the first pipe shell and second pipe shell are configured to accommodate a second pipe segment after the first pipe segment has been released, the second pipe segment being configured to maintain a cable outside of the second pipe segment.

2. Manifold as claimed in claim 1, wherein the first and second pipe shells are provided with a sealing edge.

3. Manifold as claimed in claim 2, wherein a cavity in the sealing edge defines a cable passage through which a cable may pass to outside of the manifold after removal of the releasable first pipe segment.

4. Manifold as claimed in claim 1, wherein the releasable first pipe segment comprises material that is removable by means of fracture or cracking.

5. Manifold as claimed in claim 1, wherein the first pipe segment comprises optically transparent material.

6. Medium conduit suitable for transport of a medium using pressure and suitable for receiving a cable, which medium conduit comprises a pipe and is provided with a manifold provided with a first pipe shell at a first longitudinal position and a second pipe shell at a second longitudinal position, wherein a releasable first pipe segment is disposed between the first and the second longitudinal positions, so that a portion of the cable can be brought outside the pipe between the first and the second longitudinal position by removal of the releasable first pipe segment, and wherein the first pipe shell and second pipe shell are configured to accommodate a second pipe segment after the first pipe segment has been released, the second pipe segment being configured to maintain a cable outside of the second pipe segment.

7. Method for arranging a cable in a pipe of a medium conduit suitable for transport of a medium using pressure, the method comprising the steps of
drawing the cable through a pipe of the medium conduit and a manifold comprising a first shell, a second shell and a first releasable pipe segment disposed between the first shell and the second shell;
removing the first releasable pipe segment from the manifold;
taking a segment of the cable out through the first shell and the second shell and forming a loop;
installing a second pipe segment in the manifold between the first shell and the second shell, wherein the cable remains outside of the second pipe segment.

8. Method as claimed in claim 7, wherein liquid is supplied in at least a part of the medium conduit extending from a first point downstream to a second point, wherein the cable is carried along by the liquid in the medium conduit, wherein an outer end of the cable is taken out of the medium conduit at the second point.

9. Method as claimed in claim 7, wherein taking a segment of the cable out of the first and the second shell and formation of the loop comprises the steps of:
positioning of the cable in first and second cable passages defined in the first shell and the second shell respectively; and
supplying pressure, so as to conduct the cable through the first cable passage under formation of the loop with sufficient length of cable.

10. Method as claimed in claim 9, wherein water pressure is supplied after assembly of the second pipe segment.

11. Method as claimed in claim 7, wherein the manifold is rotated at least partially to a protected position.

12. Method as claimed in claim 7, wherein a house connection is applied to the cable at the loop.

13. System comprising a medium conduit suitable for transport of a medium using pressure and comprising a plurality of individual glass fibres, wherein the medium conduit comprises a pipe and is provided with a manifold provided with a first shell at a first longitudinal position and a second shell at a second longitudinal position,
wherein the first shell comprises a first cable passage and wherein the second shell comprises a second cable passage,
wherein the cable is disposed through the first and the second cable passages so that a segment of the cable extends outside the pipe, and
wherein a separately installed pipe segment extending between the first shell and the second shell does not contain the cable.

14. System as claimed in claim 13, wherein a house connection is connected to an individual fibre of the glass fibre cable at the segment of the cable extending outside the pipe between the first shell and the second shell.

* * * * *